United States Patent Office 3,405,161
Patented Oct. 8, 1968

3,405,161
DIELS-ALDER ADDUCTS OF CYCLOPEN-
TADIENES WITH 1,1-DICYANO-2-(PHEN-
YL)ETHYLENES
Reuben Proper, Pikesville, and Friedrich W. Hoffmann,
Bel Air, Md., assignors to the United States of America
as represented by the Secretary of the Army
No Drawing. Filed June 28, 1966, Ser. No. 563,020
3 Claims. (Cl. 260—465)

ABSTRACT OF THE DISCLOSURE

A new chemical compound having the structure

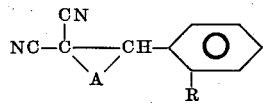

wherein A is a divalent radical selected from the group consisting of 4-cyclopenten-1,3-ylene and 3,5-tricyclo (5.2.1.0$^{2,6}$)-8-decenylene and R is a radical selected from the group consisting of halo, nitro, cyano, and hydroxy and having utility as a lachrymatory agent.

---

The present invention relates to new addition products having latent lachrymator characteristics.

We have found that new condensation products can be prepared by causing compounds containing two conjugated C=C double linkages such as cyclopentadiene and dicyclopentadiene to react upon compounds such as 1,1-dicyano-2-(substituted phenyl) ethylene. These substituted phenyl compounds can be prepared by reacting the appropriate aldehyde with malononitrile in the presence of a basic catalyst in a manner well known in the art.

Thus, our invention relates to new compounds which have the following generic formula:

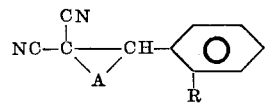

where A is a divalent radical such as 4-cyclopenten-1,3-ylene or 3,5-tricyclo[5.2.1.0$^{2,6}$]-8-decenylene; R is a halide such as fluorine, chlorine, bromine, iodide, a nitro, cyano, or hydroxyl radical.

The reaction of our invention is performed at an elevated temperature such as a refluxing temperature in the presence of a solvent. This same reaction also takes place, without heating, at room or ambient temperature for a time period consisting of several days. The reaction is considered complete when the original light yellow colored solution becomes orange-brown.

The object of our invention is to prepare a latent, stable, non-irritating lachrymator.

A further object of our invention is to prepare a compound that has indefinite storageability.

Another object of our invention is to produce a latent lachrymator adduct which can be thermally regenerated to give off a product having irritating lachrymator properties.

The chemical agents used for riot control and other similar purposes have usually been the so-called tear gases which are lachrymatory agents. However, even one of the most commonly used tear gases, ω-chloroacetophenone, suffers from the disadvantages that it is not stable in storage particularly in hot climates, it does not incapacitate or sufficiently discourage highly motivated rioters or lawbreakers since the effect being short lived and also that it causes a great deal of discomfort to the people working in manufacturing, loading, and storing of these munitions. Our products eliminate all of the disadvantages supra by remaining dormant until thermally regenerated at an elevated temperature, approximately 220° C. or greater. The product given off on heating is a potent lachrymatory agent to be used as a riot control agent and has the following formula:

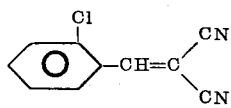

A compound of this type, 1,1-dicyano-2-(o-chlorophenyl)ethylene, and its analogs are disclosed in British Patent 967,660, issued to Douglas H. Finn et al. on Aug. 26, 1964.

The following examples illustrate the present invention without, however, restricting it thereto.

Example 1

A 250 ml. two-necked round bottomed flask containing 50 ml. of dicyclopentadiene and equipped with a thermometer and a distillation head, the condenser being filled with acetone or methylene chloride (a coolant), was heated to approximately 160° or until cyclopentadiene distilled smoothly 38–46°. The required amount of cyclopentadiene determined by interval weighings of the receiver was collected in a tared two-neck 500 ml. flask immersed in a Dry Ice bath and protected from the air by a calcium chloride drying tube.

A solution of 13 gm. (0.20 mole) of cyclopentadiene, collected supra, in 75 ml. of dry tetrahydrofuran (THF) was added to a solution of 18.9 gm. (0.10 mole) of 1,1-dicyano-2-(o-chlorophenyl)ethylene in 50 ml. of THF. The solution was then refluxed for six hours. It was during this interval that the light yellow color of the solution deepened to an orange-brown color. The solvent was stripped on a rotating evaporator, leaving 28 gm. of a white solid. The solid, recrystallized from benzene, and washed with 30–60° petroleum ether, melted at 133–134°. It was soluble in hot benzene, chloroform, acetone, and THF; it was insoluble in petroleum ether and slightly soluble in carbon tetrachloride.

*Analysis.*—Calcd. for $C_{15}H_{11}ClN_2$: C, 70.73; H, 4.35; Cl, 13.92; N, 11.00. Found: C, 70.59; H, 4.16; Cl, 14.00; N, 10.97.

The infrared spectrum of the product was found to be consistent with the proposed structure of the compound 1,2 - (4 - cyclopenten - 1,3 - xylene) - 1,1 - dicyano - 2-o-chlorophenyl)ethane, whose formula is shown below. The yield of product was 23 gm., 90% of the theoretical quantity.

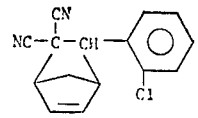

Example 2

A solution of 13 gm. (0.20 mole) of cyclopentadiene in 75 ml. of dry THF was added to a solution of 18.9 gm. (0.10 mole) of 1,1-dicyano-2(o-chlorophenyl)-ethylene in 50 ml. of THF. The solution was kept in a stoppered Erlenmeyer flask at room temperature for six days. The solution of the color changed from light yellow to orange-brown. The reaction products were analyzed by thin layer chromatography.

Type of plates: Silica gel G.
Developing solution: 30/70 (v./v.) $CCl_4$ in $CHCl_3$.
Spots developed by iodine vapor, Found:

RF 1,1-dicyano-2-(o-chlorophenyl) ethylene __ 0.59
RF 1,2 - (4-cyclopenten-1,3-ylene)-1,1-dicyano-
    2-(o-chlorophenyl)ethane _____ 0.50
RF room temperature solution _____ 0.50
RF dicyclopentadiene _____ 0.71

This reaction solution was worked up in the same manner as was the reaction solution in Example 1. The yield of 1,2-(4-cyclopenten-1,3-ylene)-1,1-dicyano-2-(o-chlorophenyl)ethane, M.P. 132–134.5° (sintering at 128–129°) was 22 gm., 86% of the theoretical quantity.

Example 3

In a 250 ml. boiling flask, 48 gm. (0.36 mole) of dicyclopentadiene was mixed with 18.9 gm. (0.10 mole) of 1,1-dicyano-2-(o-chlorophenyl)ethylene and heated for four hours at 160–170°. The flask was stoppered and allowed to stand for two days, during which time a solid precipitated from the solution. The solid which was collected and recrystallized from ethanol, melted at 201–202°.

*Analysis.*—Calcd. for $C_{20}H_{17}ClN_2$: C, 74.88; H, 5.34; Cl, 11.05; N, 8.73. Found: C, 74.84; H, 5.54; Cl, 11.0; N, 8.65.

The infrared spectrum of the solid was found to be consistent with the proposed structure, 1,2-[3,5-tricyclo (5.2.1.0$^{2,6}$) - 8 - decenylene] - 1,1 - dicyano - 2 - (o-chlorophenyl)ethane, whose formula is:

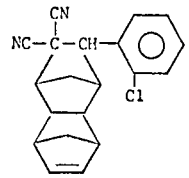

It will be obvious to persons skilled in the art that various modifications of making these products as described in the preceding examples may be made by selecting the proper 1,1-dicyano-2-phenylethylene. However, this invention is intended to cover all such modifications which reasonably fall within the scope of the appended claims.

We claim:
1. A stable, non-irritating, latent lachrymator adduct of the structure:

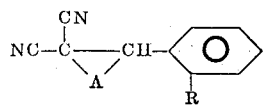

where A is a divalent radical selected from the group consisting of 4-cyclopenten-1,3-ylene and 3,5-tricyclo [5.2.1.0$^{2,6}$]-8-decenylene; R is a radical selected from the group consisting of halo, nitro, cyano, and hydroxy.

2. The compound 1,2-(4-cyclopenten-1,3-ylene)-1,1-dicyano-2-(o-chlorophenyl)ethane.

3. The compound 1,2-[3,5-tricyclo(5.2.1.0$^{2,6}$)-8-decenylene]-1,1-dicyano-2-(o-chlorophenyl)ethane.

References Cited
UNITED STATES PATENTS 3,102,841  9/1963  Vecchi et al. _____ 167—30
3,250,798  5/1966  Shulgin _____ 167—30

CHARLES B. PARKER, *Primary Examiner.*

DOLPH H. TORRENCE, *Assistant Examiner.*